US005550765A

United States Patent [19]
Bhattacharya et al.

[11] Patent Number: 5,550,765
[45] Date of Patent: Aug. 27, 1996

[54] METHOD AND APPARATUS FOR TRANSFORMING A MULTI-DIMENSIONAL MATRIX OF COEFFICENTS REPRESENTATIVE OF A SIGNAL

[75] Inventors: Arup K. Bhattacharya, Franklin Park; Syed S. Haider, Belleville, both of N.J.

[73] Assignee: Lucent Technologies Inc., Murray Hill, N.J.

[21] Appl. No.: 242,755

[22] Filed: May 13, 1994

[51] Int. Cl.$^6$ .................................................. G06F 7/38
[52] U.S. Cl. ........................................................ 364/725
[58] Field of Search ............................................ 364/725

[56] References Cited

U.S. PATENT DOCUMENTS 5,053,985  10/1991  Friedlander et al. ................. 364/725
5,181,183  1/1993  Miyazaki ............................. 364/725

*Primary Examiner*—Tan V. Mai

[57] ABSTRACT

A multi-dimensional transformer for a group of input coefficients representative of a signal or signals with a single transformer and two transpose buffers is described. A two-dimensional transform is performed by a multiplexer and a single one-dimensional transformer. In addition, the one-dimensional transformer preferably includes two separate processors, each performing part of the one-dimensional transform. Each processor may suitably be constructed of a number of primary cells, each of which includes a multiplier, addition circuit, and a register. The registers of the primary cells are connected together in a circular manner. Alternatively, a partial product circuit can be provided in place of the multipliers.

30 Claims, 10 Drawing Sheets

5,550,765

METHOD AND APPARATUS FOR TRANSFORMING A MULTI-DIMENSIONAL MATRIX OF COEFFICENTS REPRESENTATIVE OF A SIGNAL

FIELD OF THE INVENTION

This invention relates to the field of signal compression, and, more particularly, to a method and apparatus for performing a multi-dimensional forward or inverse discrete cosine transform for use in video compression.

BACKGROUND OF THE INVENTION

Forward and inverse transforms of multi-dimensional groups of time domain or frequency domain coefficients representative of a video signal or signals are important operations in proposed high definition television (HDTV) systems and multimedia systems.

Typically at a transmitter a video signal in the time domain is broken down into discrete time domain coefficients representative of the video signal. The time domain coefficients are forward transformed into frequency domain coefficients. The high frequency components can be deleted to compress the video signal. At a video receiver, such as a television, the frequency domain coefficients are inversely transformed to time domain coefficients and the time domain coefficients are used to form a video signal on the television display. The time domain and the frequency domain coefficients are digital signals in and of themselves.

Two-dimensional inverse and forward discrete cosine transforms are particularly important for systems which comply with video compression standards such as Joint Picture Expert Group (JPEG) and Motion Picture Expert Group (MPEG). However, both forward and inverse transforms are computationally intensive and difficult to implement in very large scale integrated circuits (VLSI) using direct matrix multiplication.

Knauer et al. ("Knauer") discloses an apparatus for performing a forward and inverse two-dimensional discrete cosine transform in U.S. Pat. No. 4,829,465. (See col. 1, lns. 8–9) In FIG. 1 of that patent, Knauer shows a block diagram for a two-dimensional forward discrete cosine transformer comprised of a first transposition stage and two consecutive one-dimensional transformers separated by a second transposition stage. Knauer further discloses a one-dimensional transformer which reduces the number of multiplications required by prior one-dimensional transformers by taking advantage of the symmetry in a transform matrix.

SUMMARY OF THE INVENTION

The present invention provides a method and apparatus for performing a forward or inverse transform of a multi-dimensional group of time domain or frequency domain coefficients representative of a signal or signals. A single one-dimensional transformer is preferably used to provide the multi-dimensional transform. In addition, a single transpose buffer is provided at each of two transposition stages.

In one embodiment, a multiplexer, a one-dimensional transformer, and two transpose buffers are provided. During a first pass through the one-dimensional transformer, input coefficients are written column by column to the first transpose buffer, and read out, row by row, via the multiplexer, by the one-dimensional transformer. The input coefficients are one dimensionally transformed and then written, vector by vector, to the second transpose buffer. As will be described, the vectors may be rows or columns.

During a second pass, through the one-dimensional transformer the one-dimensionally transformed coefficients are read out, as transposed vectors, via the multiplexer by the one-dimensional transformer. The one-dimensionally transformed coefficients are one-dimensionally transformed during the second pass to form a two-dimensional transform. The output of the one-dimensional transformer can be fed back through multiple passes to provide a multi-dimensional transform of a multi-dimensional group of coefficients. Preferably, a two-dimensional transform is provided.

In another embodiment a first and a second multiplexer are provided along with the one-dimensional transformer and the two transpose buffers. The one-dimensional transformer is comprised of a first coefficients processor and a second coefficients processor.

During a first pass, input coefficients are written in a zigzag manner to the first transpose buffer. The input coefficients are read out, row by row, to reverse the zigzag operation and to perform a transpose operation. The input coefficients from the odd locations in the row vector are sent to the first coefficients processor and the input coefficients from the even locations in the row vector are sent to the second coefficients processor. Each of these processors perform part of a one-dimensional transform operation. The outputs of the first and second coefficients processors combine to provide a one-dimensional transform of the input coefficients. The one-dimensionally transformed coefficients are then written, vector by vector to the second transpose buffer. The vectors can be rows or columns as will be later described.

During a second pass, the one-dimensionally transformed coefficients from odd and even locations in each transposed vector are fed back, vector by vector, from the second transpose buffer to the first and second coefficients processors, respectively. The first and second coefficients processors each perform part of a one-dimensional transform operation on the one-dimensionally transformed coefficients. The second pass outputs of the first and second coefficients processors are combined to form a two-dimensional transform of the input coefficients.

Preferably, the present invention alternates between reading and writing row vectors from and to the second transpose buffer and reading and writing column vectors from and to the second transpose buffer. Preferably, eight vectors of the first block of one-dimensionally transformed coefficients are written as row vectors in the second transpose buffer and then one column vector of one dimensionally transformed coefficients is read out. The next vector of one-dimensionally transformed coefficients is written as a column vector in the location of the just read out column vector. Similarly, after other column vectors are read out, they are replaced with a new vector of one-dimensionally transformed coefficients. After reading and writing eight column vectors, the transformer switches back to reading and writing row vectors. This technique allows a single second transpose buffer to be used and provides continuous coefficient vector flow.

The first and second pass are preferably intermixed so that one row of input coefficients is one-dimensionally transformed and then one vector of one-dimensionally transformed coefficients is one-dimensionally transformed.

Processors which separate coefficients into groupings other than odd and even coefficients are also within the scope of the present invention.

Preferably, the first and second coefficients processors are each built by the use of a primary cell. The primary cell is comprised of a multiplier, an addition circuit, a sign change unit, and a register. The registers are connected in a circular manner. During design, this primary cell can be laid out efficiently and repeated.

In accordance with another aspect of the invention, the multipliers of the primary cells are replaced by a multiplication circuit comprised of a plurality of partial product multipliers. The input coefficients and one-dimensionally transformed coefficients are multiplied by small factors to produce partial products which can be shared in the computation of full products of the coefficients times transform matrix constants.

The present invention is particularly useful for video compression techniques. The use of a single one-dimensional transformer in accordance with the present invention reduces chip space by about 40% of the chip space required by two one-dimensional transformers in series. The use of single transpose buffers at each transpose stage also reduces chip space.

The above discussed features, as well as additional features and advantages of the present invention, will become more readily apparent by reference to the following detailed description and the accompanying drawings.

DETAILED DESCRIPTION OF THE INVENTION

Figure 1:
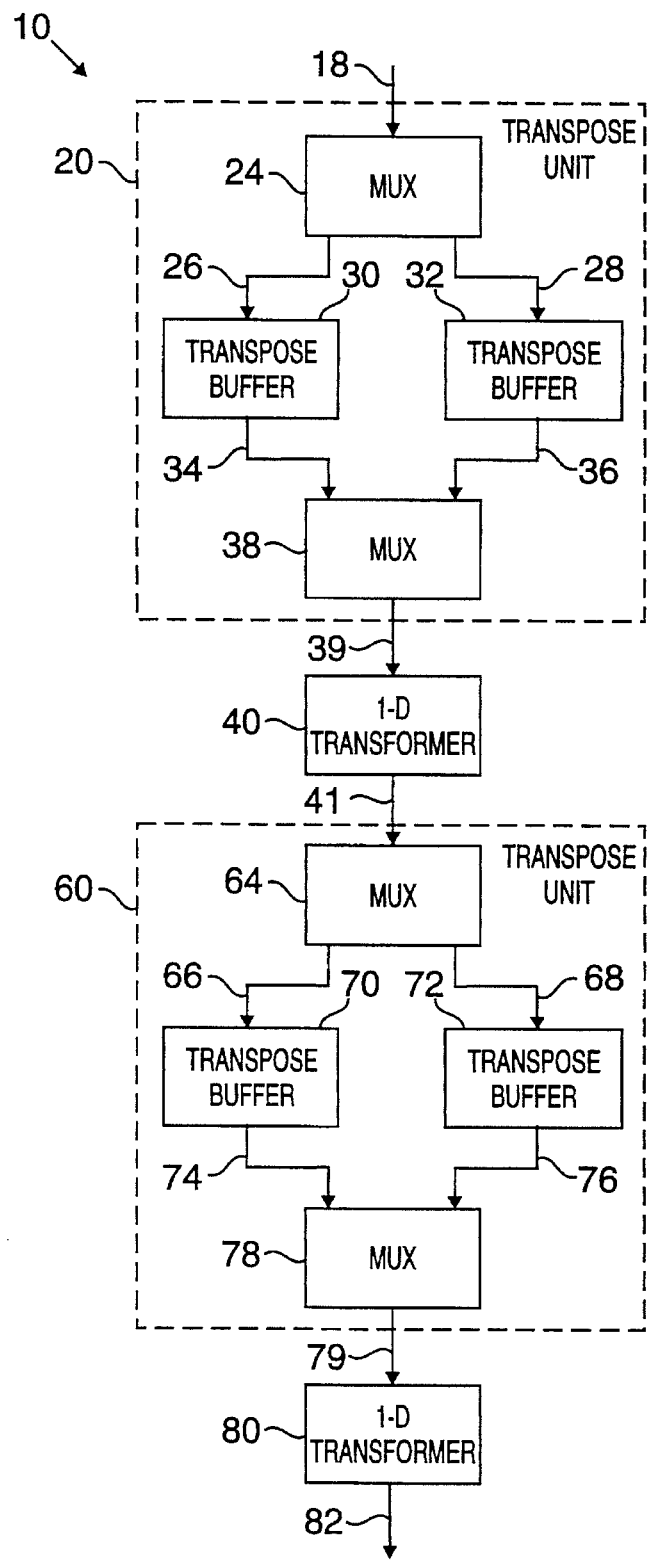
FIG. 1 is a schematic of a prior art two-dimensional transformer.

FIG. 1 is a schematic of a simplified transformer 10 of the prior art similar to that shown in Knauer's U.S. Pat. No. 4,829,465, for providing a transform of a two-dimensional matrix of coefficients. The transformer 10 comprises a transpose unit 20, a one-dimensional transformer 40, a transpose unit 60, and a one-dimensional transformer 80.

An input bus 18 is connected to the transpose unit 20. The transpose unit 20 is comprised of a multiplexer 24, transpose buffers 30 and 32, and a multiplexer 38. The input bus 18 is connected to the multiplexer 24, whose outputs 26 and 28 are connected to the transpose buffers 30 and 32, respectively. The transpose buffers 30 and 32 are connected to the multiplexer 38 via output buses 34 and 36. The multiplexer 38 is connected via output bus 39 to the one-dimensional transformer 40.

The transpose unit 60 is identical to the transpose unit 20 and each component of the transpose unit 60 has an identifying number which is forty more that the corresponding component of the transpose unit 20. The transpose unit 60 is connected via output bus 79 to a second one-dimensional transformer 80, which has an output bus 82.

In operation, input coefficients are sent one column at a time through the multiplexer 24 of the transpose unit 20 and written to the transpose buffer 30. After the transpose buffer 30 has been filled with eight columns of input coefficients, a row from the transpose buffer 30 is read out via the multiplexer 38 and sent to the one-dimensional transformer 40. While the transpose buffer 30 is being read out, columns of input coefficients from the input bus 18 are sent one column at a time through the multiplexer 24 and written to the transpose buffer 32. The transpose unit 20 alternates between writing to the transpose buffer 30 and reading from the transpose buffer 32 half of the time, and writing to the transpose buffer 32 and reading from the transpose buffer 30 the other half of the time.

The one dimensional transformer 40 transforms each row of coefficients received, and sends a row of one-dimensionally transformed coefficients to the transpose unit 60. The transpose unit 60 functions identically to the transpose unit 20, alternating between writing to the transpose buffer 70 and reading from the transpose buffer 72 half of the time, and writing to the transpose buffer 72 and reading from the transpose buffer 70, the other half of the time.

The output of the transpose unit 60 is a column of one-dimensionally transformed coefficients, and the column is transformed by the one-dimensional transformer 80. The output from one-dimensional transformer 80 is a two-dimensional transform of a column of input coefficients. Typically eight columns are output to form an 8×8 two-dimensional block of two-dimensionally transformed coefficients.

Figure 2:
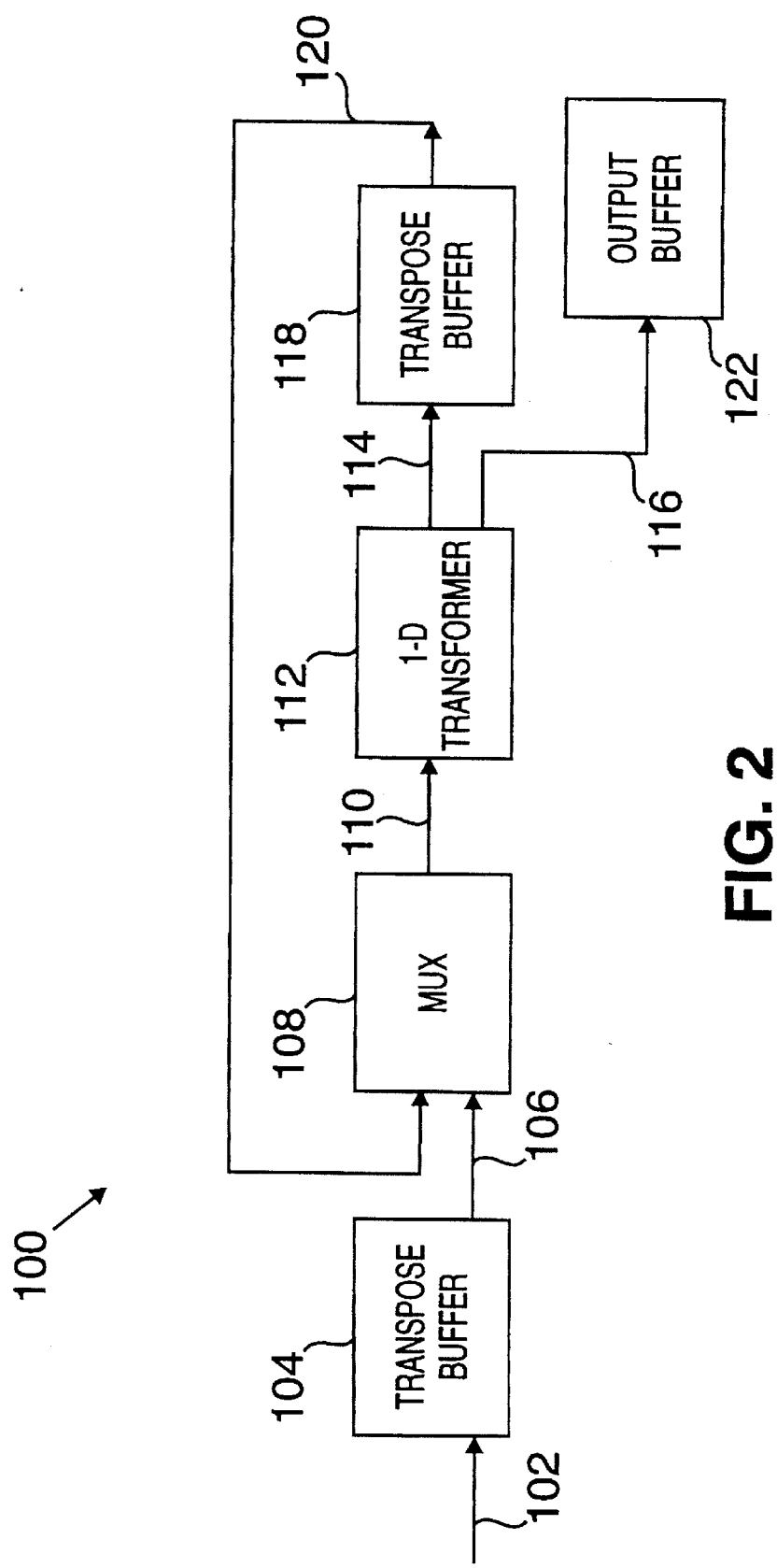
FIG. 2 is a schematic of an apparatus for providing a two dimensional transform in accordance with one embodiment of the present invention.

In contrast to the prior art transformer 10 of FIG. 1, the transformer of the present invention uses a single one-dimensional transformer and a single transpose buffer at each transposition stage, which reduces chip space. FIG. 2 illustrates a transformer 100 for providing a two-dimensional transform in accordance with one embodiment of the present invention. The transformer 100 includes a transpose buffer 104, a multiplexer 108, a one-dimensional transformer 112, a transpose buffer 118, and an output buffer 122.

An input bus 102 is connected to the transpose buffer 104, which is connected via an output bus 106 to a first input of the multiplexer 108. The multiplexer 108 is connected to the one-dimensional transformer 112 by an output bus 110. The one-dimensional transformer 112 is connected by an output bus 114 to the transpose buffer 118 and by an output bus 116 to the output buffer 122. The transpose buffer 118 is connected to the multiplexer 108 via a bus 120.

In operation, a two-dimensional block of input coefficients which is representative of a signal or signals, such as video signals, is written, in a zig-zag manner, to the transpose buffer 104. During a first pass, the input coefficients are read out, row by row to cause a transpose and a reverse zig-zag operation. The input coefficients are then sent through the multiplexer 108, and transformed by the one-dimensional transformer 112. The one-dimensionally transformed coefficients are written to the transpose buffer 118, vector by vector. The vectors can be rows or columns as will be described later.

During a second pass, the one dimensionally transformed coefficients are read out from the transpose buffer 118, transposed vector by transposed vector, and sent through the multiplexer 108 to the one-dimensional transformer 112. The output on the output bus 116, following the second pass, is a two-dimensionally transformed vector of input coefficients. The vectors are stored as columns in the output buffer 122. Preferably, an 8×8 block of input coefficients is two-dimensionally transformed into an 8×8 block of two-dimensionally transformed coefficients which is stored in the output buffer 122.

Figure 5A:
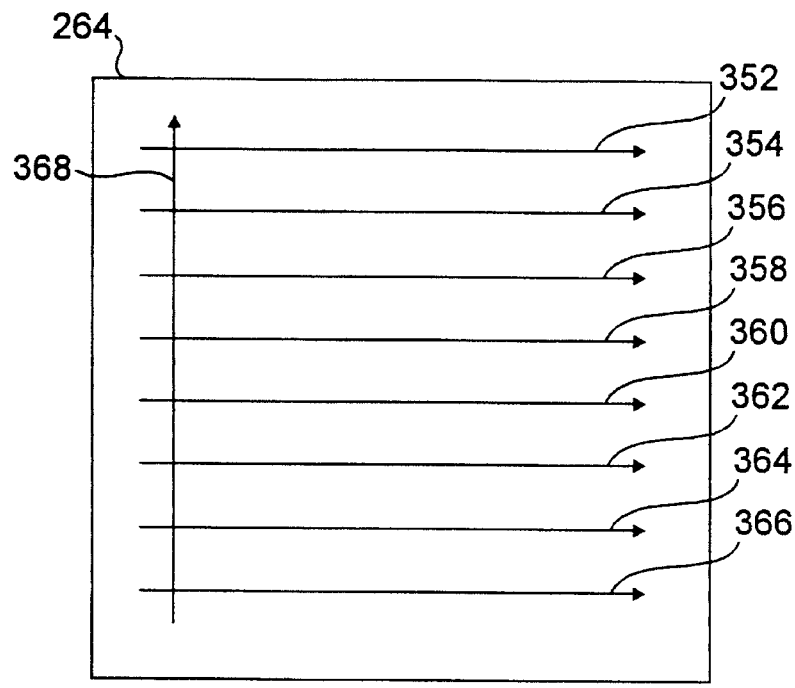
FIGS. 5A and 5B show the technique of alternating between reading and writing columns and reading and writing rows from and to a second transpose buffer.

A single transpose buffer 104 can be used at the first transposition stage by writing coefficients in a zig-zag manner and reading out a first row of coefficients after the transpose buffer 104 is diagonally half full. A single transpose buffer 118 can be used at the second transpose stage because the one-dimensionally transformed vectors are alternately read and written row-wise half of the time and read and written column-wise the other half of the time to the transpose buffer 118. This aspect of the present invention will be explained more fully with reference to FIGS. 5A and 5B.

Figure 3:
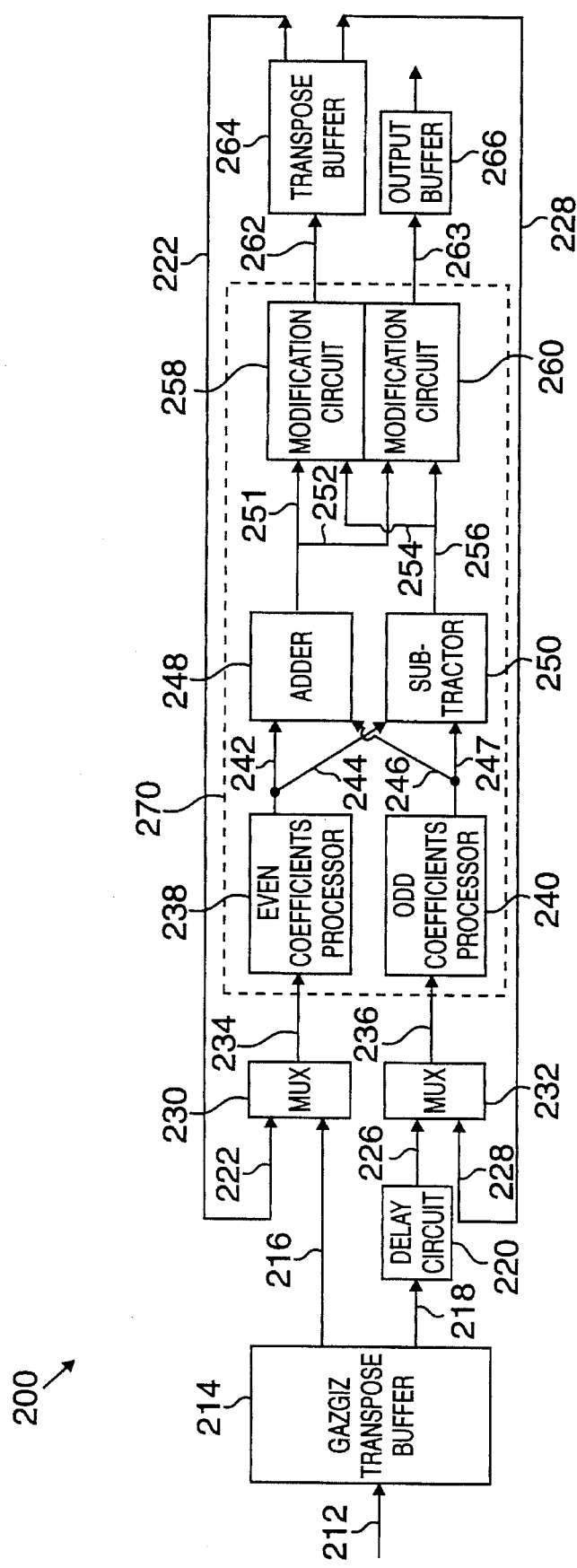
FIG. 3 is a schematic of an apparatus which separates input coefficients and one-dimensionally transformed coefficients into two sets of coefficients and provides a two-dimensional transform in accordance with another embodiment of the present invention.

The present invention is preferably implemented using an inverse or forward discrete cosine transform. FIG. 3 illustrates a two-dimensional inverse discrete cosine transformer 200 in accordance with the present invention. Before describing the transformer 200, the theoretical basis for separating a one-dimensional inverse discrete cosine transform into two separate operations in accordance with the present invention, is discussed.

The equation for a two-dimensional inverse discrete cosine transform for a block size N×N is known and is defined as:

$$P(x,y) = \frac{2}{N} \sum_{u=0}^{N-1} \sum_{v=0}^{N-1} C(u)C(v)F(u,v)\cos\left\{\frac{(2x+1)u\pi}{2N}\right\}\cos\left\{\frac{(2y+1)v\pi}{2N}\right\},$$

where x and y are time coordinates in the pel, picture or time domain, and u and v are frequency coordinates in the frequency domain. $P(x, y)$ is the function for determining coefficients in the time domain which are representative of a signal. $F(u, v)$ is the function for determining coefficients in the frequency domain which are representative of the signal. Each time domain coefficient and frequency domain coefficient is also a digital signal in and of itself. Also, $C(u)$, $C(v)=\frac{1}{2}$ if $\mu,v=0$; $C(\mu)$, $C(v)=1$, otherwise. The two dimensional inverse discrete cosine transform can be decomposed into two N point one-dimensional inverse discrete cosine transforms, each of a form similar to that shown below:

$$P(x) = \sqrt{\frac{2}{N}} \sum_{u=0}^{N-1} C(u)F(u) \cos\left\{\frac{(2x+1)u\pi}{2N}\right\},$$

where $P(x)$ is the function for determining coefficients in the x-plane of the time domain which are representative of the signal, and $F(u)$ is the function for determining coefficients in the u-plane in the frequency domain which are representative of the signal. The inverse discrete cosine transform ("IDCT") constants are defined as:

$$T_{xu} = C(u) \cos\left\{\frac{(2x+1)u\pi}{2N}\right\}$$

The one-dimensional inverse discrete cosine transform can also be represented in the following matrix format:

$$P = \sqrt{\frac{2}{N}} \ TF,$$

where P is an N×1 pixel vector of coefficients in the time domain, F is an N×1 discrete cosine transform vector of coefficients in the frequency domain and T is the N×N IDCT constant matrix.

The one-dimensional IDCT, where N=8, can be expressed in its full form as shown below:

$$\begin{bmatrix} P_0 \\ P_1 \\ P_2 \\ P_3 \\ P_4 \\ P_5 \\ P_6 \\ P_7 \end{bmatrix} = \frac{1}{2} \begin{bmatrix} 0.7072 & 0.9808 & 0.9238 & 0.8314 & 0.7072 & 0.5556 & 0.3826 & 0.1950 \\ 0.7072 & 0.8314 & 0.3826 & -0.1950 & -0.7072 & -0.9808 & -0.9238 & -0.5556 \\ 0.7072 & 0.5556 & -0.3826 & -0.9808 & -0.7072 & 0.1950 & 0.9238 & 0.8314 \\ 0.7072 & 0.1950 & -0.9238 & -0.5556 & 0.7072 & 0.8314 & -0.3826 & -0.9808 \\ 0.7072 & -0.1950 & -0.9238 & 0.5556 & 0.7072 & -0.8314 & -0.3826 & 0.9808 \\ 0.7072 & -0.5556 & -0.3826 & 0.9808 & -0.7072 & -0.1950 & 0.9238 & -0.8314 \\ 0.7072 & -0.8314 & 0.3826 & 0.1950 & -0.7072 & 0.9808 & -0.9238 & 0.5556 \\ 0.7072 & -0.9808 & 0.9238 & -0.8314 & 0.7072 & -0.5556 & 0.3826 & -0.1950 \end{bmatrix} \begin{bmatrix} F_0 \\ F_1 \\ F_2 \\ F_3 \\ F_4 \\ F_5 \\ F_6 \\ F_7 \end{bmatrix}$$

This equation can be manipulated mathematically. For example, the columns of the IDCT constant matrix T can be reordered in any manner as long as the rows of the vector F are reordered in a like manner. For example, the columns 0–7 of IDCT constant matrix T can be reordered 0, 4, 2, 6, 1, 5, 7, 3, if the rows 0–7 of vector F are similarly reordered 0, 4, 2, 6, 1, 5, 7, 3. The above reordering results in the following equation:

$$\begin{bmatrix} P_0 \\ P_1 \\ P_2 \\ P_3 \\ P_4 \\ P_5 \\ P_6 \\ P_7 \end{bmatrix} = \frac{1}{2} \begin{bmatrix} 0.7072 & 0.7072 & 0.9238 & 0.3826 & 0.9808 & 0.5556 & 0.1950 & 0.8314 \\ 0.7072 & -0.7072 & 0.3826 & -0.9238 & 0.8314 & -0.9808 & -0.5556 & -0.1950 \\ 0.7072 & -0.7072 & -0.3826 & 0.9238 & 0.5556 & 0.1950 & 0.8314 & -0.9808 \\ 0.7072 & 0.7072 & -0.9236 & -0.3826 & 0.1950 & 0.8314 & -0.9808 & -0.5556 \\ 0.7072 & 0.7072 & -0.9236 & -0.3826 & -0.1950 & -0.8314 & 0.9808 & 0.5556 \\ 0.7072 & -0.7072 & -0.3826 & 0.9238 & -0.5556 & -0.1950 & -0.8314 & 0.9808 \\ 0.7072 & -0.7072 & 0.3826 & -0.9238 & -0.8314 & 0.9808 & 0.5556 & 0.1950 \\ 0.7072 & 0.7072 & 0.9238 & 0.3826 & -0.9808 & -0.5556 & -0.1950 & 0.8314 \end{bmatrix} \begin{bmatrix} F_0 \\ F_4 \\ F_2 \\ F_6 \\ F_1 \\ F_5 \\ F_7 \\ F_3 \end{bmatrix}$$

In the equation above, odd input frequency domain coefficients $F_1$, $F_5$, $F_7$, and $F_3$, and even frequency domain coefficients $F_0$, $F_4$, $F_2$, and $F_6$, are separately grouped.

The matrix equation shown above can be further manipulated. For example, the rows of the IDCT constant matrix T can be reordered as long as the rows of the pixel vector P are reordered in a like manner. If the rows of the modified IDCT constant matrix T, above, are reordered from 0–7 to 0, 5, 3, 6, 7, 2, 4, 1, for example, then the components of vector P are reordered in the same manner. This further reordering results in the following matrix equation.

$$\begin{bmatrix} P_0 \\ P_5 \\ P_3 \\ P_6 \\ P_7 \\ P_2 \\ P_4 \\ P_1 \end{bmatrix} = \frac{1}{2} \begin{bmatrix} 0.7072 & 0.7072 & 0.9238 & 0.3826 & | & 0.9808 & 0.5556 & 0.1950 & 0.8314 \\ 0.7072 & -0.7072 & -0.3826 & 0.9238 & | & -0.5556 & -0.1950 & -0.8314 & 0.9808 \\ 0.707 & 0.7072 & -0.9238 & -0.3826 & | & 0.1950 & 0.8314 & -0.9808 & -0.5556 \\ 0.7072 & -0.7072 & 0.3826 & -0.9238 & | & -0.8314 & 0.9808 & 0.5556 & 0.1950 \\ \hline 0.7072 & 0.7072 & 0.9238 & 0.3826 & | & -0.9808 & -0.5556 & -0.1950 & 0.8314 \\ 0.7072 & -0.7072 & -0.3826 & 0.9238 & | & 0.5556 & 0.1950 & 0.8314 & -0.9808 \\ 0.7072 & 0.7072 & -0.923 & -0.3826 & | & -0.1950 & -0.8314 & 0.9808 & 0.5556 \\ 0.7072 & -0.7072 & 0.382 & -0.9238 & | & 0.8314 & -0.9808 & -0.5556 & -0.1950 \end{bmatrix} \begin{bmatrix} F_0 \\ F_4 \\ F_2 \\ F_6 \\ F_1 \\ F_5 \\ F_7 \\ F_3 \end{bmatrix}$$

The reordered IDCT constant matrix T shown above possesses a certain symmetry such that the matrix equation can be expressed in the following format:

$$\begin{bmatrix} P_0 \\ P_5 \\ P_3 \\ P_6 \\ P_7 \\ P_2 \\ P_4 \\ P_1 \end{bmatrix} = \frac{1}{2} \begin{bmatrix} A & B \\ A & -B \end{bmatrix} \begin{bmatrix} F_0 \\ F_4 \\ F_2 \\ F_6 \\ F_1 \\ F_5 \\ F_7 \\ F_3 \end{bmatrix}$$

where $$A = \begin{bmatrix} 0.7072 & 0.7072 & 0.9238 & 0.3826 \\ 0.7072 & -0.7072 & -0.3826 & 0.9238 \\ 0.7072 & 0.7072 & -0.9238 & -0.3826 \\ 0.7072 & -0.7072 & 0.3826 & -0.9238 \end{bmatrix}$$

$$B = \begin{bmatrix} 0.9808 & 0.5556 & 0.1950 & 0.8314 \\ -0.5556 & -0.1950 & -0.8314 & 0.9808 \\ 0.1950 & 0.8314 & -0.9808 & -0.5556 \\ -0.8314 & 0.9808 & 0.5556 & 0.1950 \end{bmatrix}$$

The above format permits the one-dimensional inverse discrete cosine transform matrix operation to be performed by a combination of two separate operations which can later be combined together as shown below:

$$\begin{bmatrix} H_0 \\ H_1 \\ H_2 \\ H_3 \end{bmatrix} = \frac{1}{2} [A] \begin{bmatrix} F_0 \\ F_4 \\ F_2 \\ F_6 \end{bmatrix}$$

$$\begin{bmatrix} K_0 \\ K_1 \\ K_2 \\ K_3 \end{bmatrix} = \frac{1}{2} [B] \begin{bmatrix} F_1 \\ F_5 \\ F_7 \\ F_3 \end{bmatrix}$$

$$\rightarrow \begin{bmatrix} P_0 \\ P_3 \\ P_5 \\ P_6 \\ P_7 \\ P_4 \\ P_2 \\ P_1 \end{bmatrix} = \begin{bmatrix} H_0 + K_0 \\ H_2 + K_2 \\ H_1 + K_1 \\ H_3 + K_3 \\ H_0 - K_0 \\ H_2 - K_2 \\ H_1 - K_1 \\ H_3 - K_3 \end{bmatrix}$$

(H + K) adder (H − K) subtractor

The vector H, whose components are $H_0$, $H_1$, $H_2$ and $H_3$, equals one-half times the matrix A times the even coefficients of F, whose components are $F_0$, $F_4$, $F_2$ and $F_6$. The vector K, whose components are $K_0$, $K_1$, $K_2$, and $K_3$, equals one-half times the matrix B times the odd coefficients of the vector F, whose components are $F_1$, $F_5$, $F_7$, and $F_3$. The vectors H and K can be added and subtracted as indicated above to form the time domain coefficients P. Note that $P_5$ and $P_3$ have changed places and $P_2$ and $P_4$ have changed places to enable easier addressing.

FIG. 3 illustrates another embodiment of the present invention wherein a two-dimensional inverse discrete cosine transformer 200 is provided. This embodiment takes advantage of the symmetry recognized from the above matrix manipulations to provide separate processing for two different sets of coefficients, preferably one set from the even locations of an input coefficient vector F representative of a portion of a video signal and one set from the odd locations of an input coefficient vector F representative of a portion of a video signal. The transformer 200 comprises GAZGIZ transpose buffer 214, a first multiplexer 230, a second multiplexer 232, a one-dimensional inverse discrete cosine transformer 270, and a transpose buffer 264.

A coefficient input bus 212 is connected to the GAZGIZ transpose buffer 214, which is connected to the multiplexer 230 and a delay circuit 220 by the output buses 216 and 218, respectively. The delay circuit 220 is connected to the multiplexer 232 by an output bus 226. The multiplexers 230 and 232 are connected to the one-dimensional transformer 270 by output buses 234 and 236, respectively. More specifically, the multiplexers 230 and 232 are connected to an even coefficients processor 238 and an odd coefficients processor 240, by output buses 234 and 236, respectively. The even coefficients processor 238 is connected to an adder circuit 248 and a subtracter circuit 250 by output buses 242 and 244, respectively, while odd coefficients processor 240 is connected to the adder circuit 248 and the subtracter circuit 250 by output buses 246 and 247, respectively.

The adder circuit 248 and the subtracter circuit 250 are both connected to the modification circuits 258 and 260. The adder circuit 248 is connected to the modification circuits 258 and 260 by output buses 251 and 252, respectively, while the subtracter circuit 250 is connected to the modification circuits 258 and 260 by output buses 254 and 256, respectively. The modification circuit 258 is connected to the transpose buffer 264 by an output bus 262 and the modification circuit 260 is connected to an output buffer 266 by the output bus 263. The transpose buffer 264 is connected to the multiplexers 230 and 232 via the output buses 222 and 228, respectively.

Figure 4A:
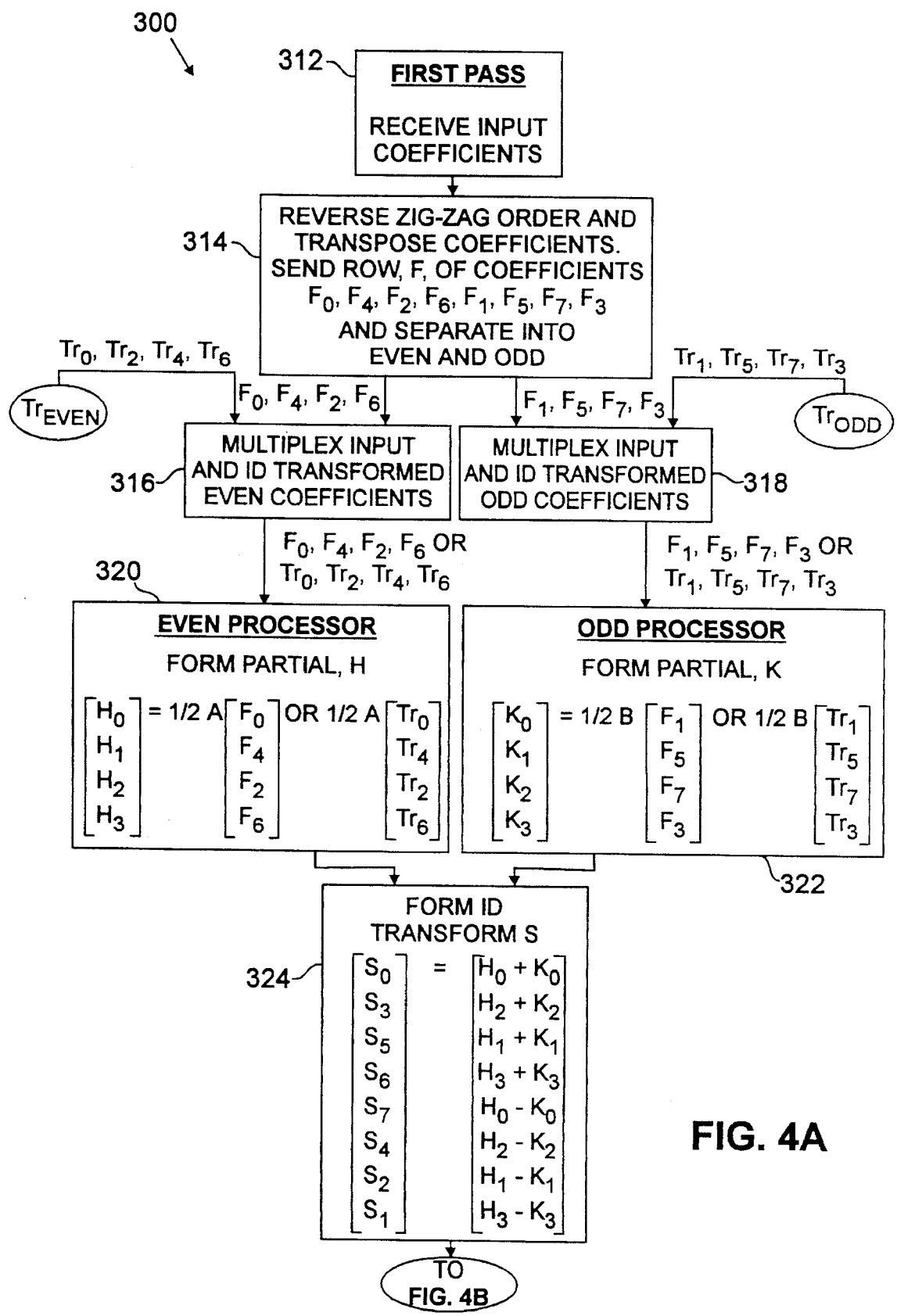
FIGS. 4A and 4B are flow charts of the operation of the two-dimensional transformer of FIG. 3.
Figure 4B:
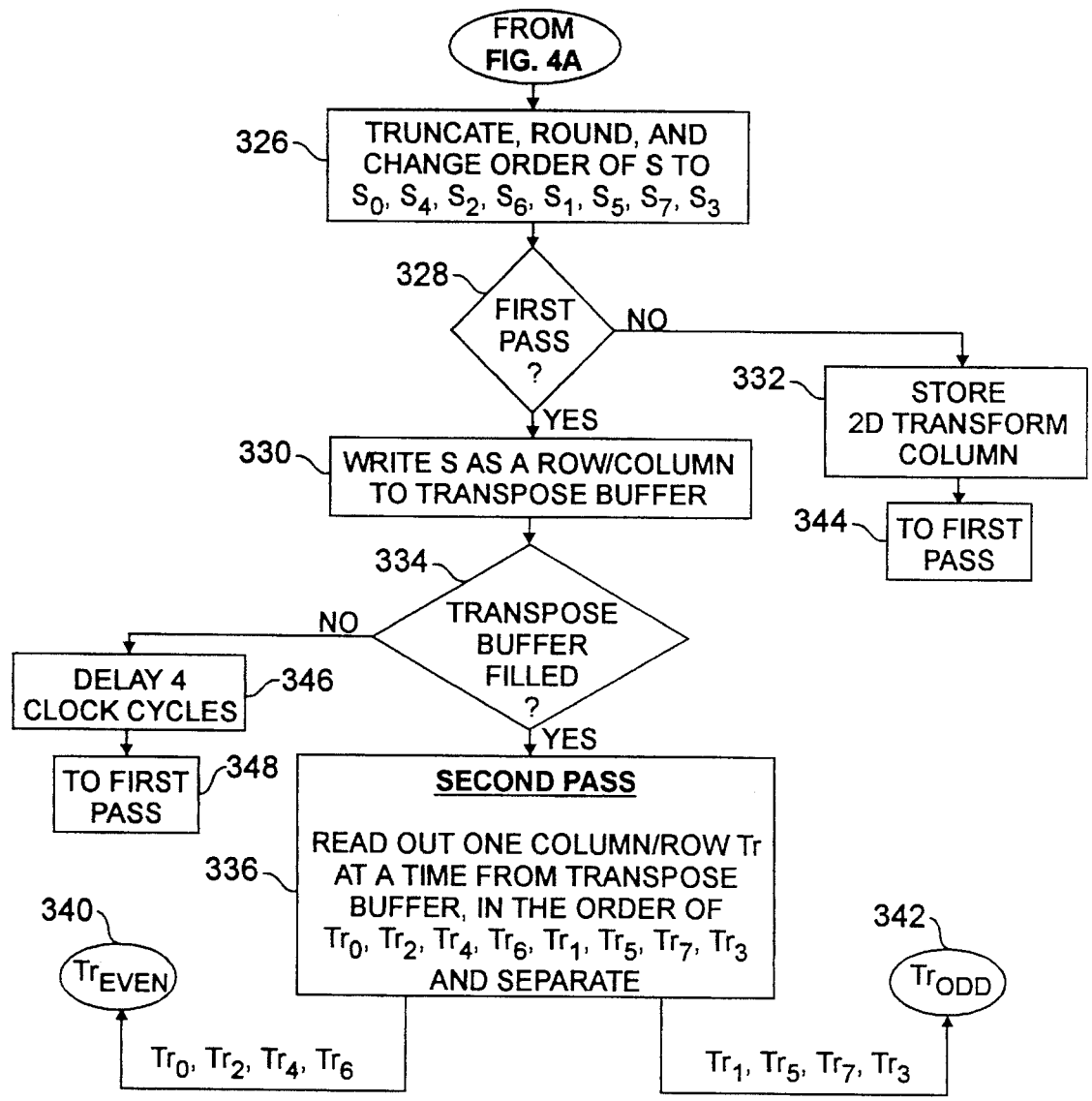

FIGS. 4A and 4B are flow charts of the operation of the transformer 200 of FIG. 3. Input frequency coefficients are written in zigzag order, which is a known video standard, to the GAZGIZ buffer 214 at step 312 of the flow chart 300 in FIG. 4. When the GAZGIZ buffer 214 is diagonally half full, the input coefficients are read out as row vectors, which causes both a reversal of the zigzag ordering and a transposition of the input coefficients. The components of each vector F are further read out in the order $F_0$, $F_4$, $F_2$, $F_6$, $F_1$, $F_5$, $F_7$, and $F_3$, where component $F_3$ is first and component $F_0$ is last. The components $F_1$, $F_5$, $F_7$, and $F_3$ are delayed four clock cycles by the delay circuit 220 so that the components $F_1$, $F_5$, $F_7$, and $F_3$ and the components $F_0$, $F_4$, $F_2$, and $F_6$ can be processed simultaneously by the odd coefficients processor 238 and the even coefficients processor 240, respectively. The rows of the GAZGIZ buffer 214 are read out from the first row through the eighth row, and then the reading cycle is repeated.

The input even coefficients of the row vector F are multiplexed, along with fed back one-dimensionally transformed even coefficients of the vector Tr, which will be described later, by the multiplexer 230, into the even coefficients processor 238 at step 316. Preferably, the multiplexer 230 alternates between sending four input even coefficients, $F_0$, $F_4$, $F_2$, and $F_6$ and sending four one-dimensionally transformed even coefficients, $Tr_0$, $Tr_2$, $Tr_4$, and $Tr_6$ to the even coefficients processor 238. Similarly, the input odd coefficients of the row vector F are multiplexed, along with the fed back one-dimensionally transformed odd coefficients of the vector Tr, which will be described later, by the multiplexer 232, into the odd coefficients processor 240 at step 318.

The even coefficients processor 238 performs part of the operation required for the one-dimensional transform of the input coefficients. The even coefficients processor 238 forms a vector H which, during the first pass, is set equal to one half times the 4×4 matrix A multiplied by the even coefficients of the vector F, as shown in step 320. The matrix A is of the form discussed previously.

The odd coefficients processor 240 similarly performs part of the operations required for a one-dimensional transform of the input coefficients. The even coefficients processor determines a vector K which, during the first pass, is set equal to one half times the 4×4 matrix B multiplied by the odd coefficients of vector F as specified in step 322. The matrix B is of the form discussed previously.

The H vector from the even coefficients processor 238 and the K vector from the odd coefficients processor 240 are combined by subtraction and addition operations to form a one-dimensional transform of the input coefficients. The H vector and the K vector are added by the adder circuit 248 and are subtracted by the subtracter circuit 250, to form the vector S as specified in step 324 of FIG. 4.

It is determined that this is a first pass at step 328, and the one-dimensionally transformed vector S is resequenced from $S_0$, $S_3$, $S_5$, $S_6$, $S_7$, $S_4$, $S_2$, and $S_1$ to $S_0$, $S_4$, $S_2$, $S_6$, $S_1$, $S_5$, $S_7$, and $S_3$, truncated and rounded by modification circuit 258, and then written to the transpose buffer 264 at step 330. When the transpose buffer 264 has been filled with 8 vectors of one-dimensionally transformed coefficients, the one-dimensionally transformed coefficients are fed back, transposed vector by transposed vector, to the multiplexers 230 and 232. Each transposed vector Tr of the one-dimensionally transformed coefficients is read back in the order, $Tr_0$, $Tr_4$, $Tr_2$, $Tr_6$, $Tr_1$, $Tr_5$, $Tr_7$, and $Tr_3$, by addressing of the output lines. This can also be accomplished by a resequence buffer. The one-dimensionally transformed coefficients of vector Tr are then separated into odd and even coefficients at steps 340 and 342.

During a second pass, the one-dimensionally transformed coefficients are multiplexed via the multiplexers 230 and 232 into the even and odd coefficients processors 238 and 240, respectively, at steps 316 and 318. The one-dimensionally transformed coefficients of vector Tr are subjected to the same one-dimensional transform process as the input coefficients of vector F. The vectors H and K are calculated at steps 320 and 322 for the one dimensionally transformed coefficients of vector Tr and the vectors H and K are later combined at step 324 to form a one-dimensional transform vector S.

At decisional element 328, it is determined whether this is the first pass. If this is not the first pass, then the result at the output of the one-dimensional transformer 270 is a two-dimensional transform of a vector F of input coefficients. The two-dimensional transform results are stored as a column in the output buffer 266 at step 332. The method then cycles back to the first pass at step 344.

If the transpose buffer 264 has not been filled with an 8×8 block of one-dimensionally transformed coefficients, the transformer 200 performs only first pass operations as shown by steps 334, 346, and 348. In between each first pass one-dimensional transform of a vector F of input coefficients, there is a delay shown at step 346, corresponding to the length of time normally required by a second pass operation.

Figure 5B:
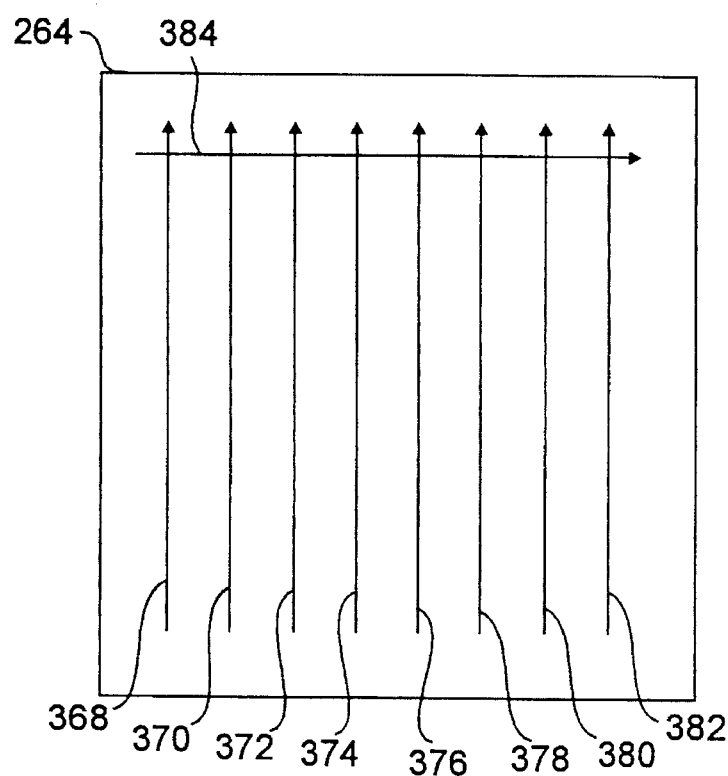

The read/write technique preferably used in the transformer of the present invention enables the use of a single transpose buffer 264. The first block of one-dimensionally transformed coefficients are written row-wise and after a two-dimensional block is received by transpose buffer 264, the block is read out column-wise. This can be seen in FIG. 5A where after the rows 352–366 of one-dimensionally transformed S vectors are written to the transpose buffer 264, column vectors Tr are read out starting with column 368. After a column vector Tr is read out, a new column of one-dimensionally transformed coefficients of a vector S is written in its place in the transposed buffer 264. FIG. 5B shows columns 368–382 written to the transpose buffer 264. After the columns 368–382 are written, Tr row vectors, are read out starting with row 384. When the next one-dimensional transform coefficient vector S is received it is written to row 384. Thus, there is an alternation between reading column-wise and writing column-wise, and reading row-wise and writing row-wise at transposition buffer 264.

The transpose buffer 264 and the GAZGIZ buffer 214 can be a pitchmatched array of custom cells based on parameterized register files as known in the art.

Figure 6:
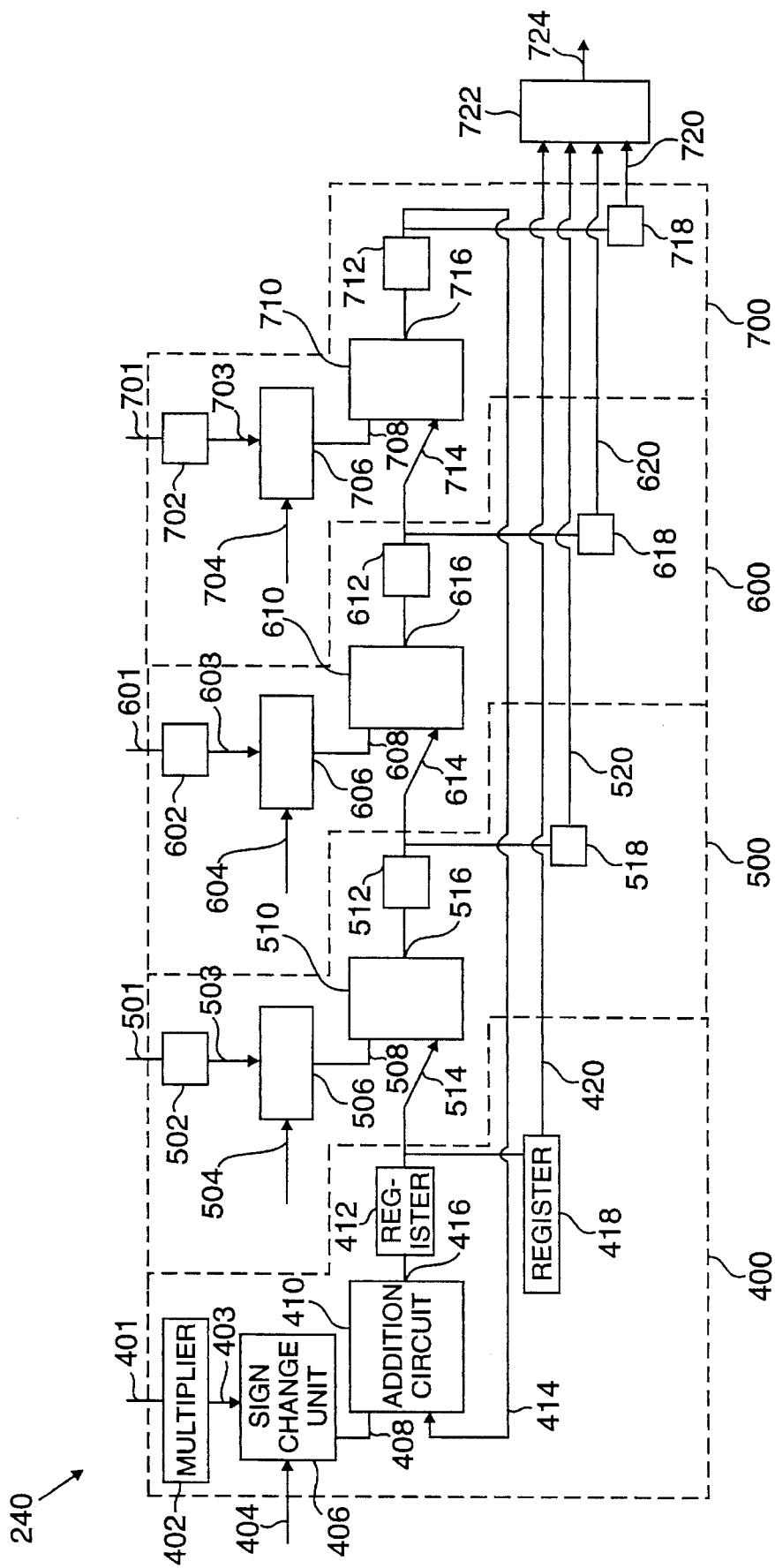
FIG. 6 is a more detailed schematic of the odd coefficients processor of FIG. 3.
Figure 7:
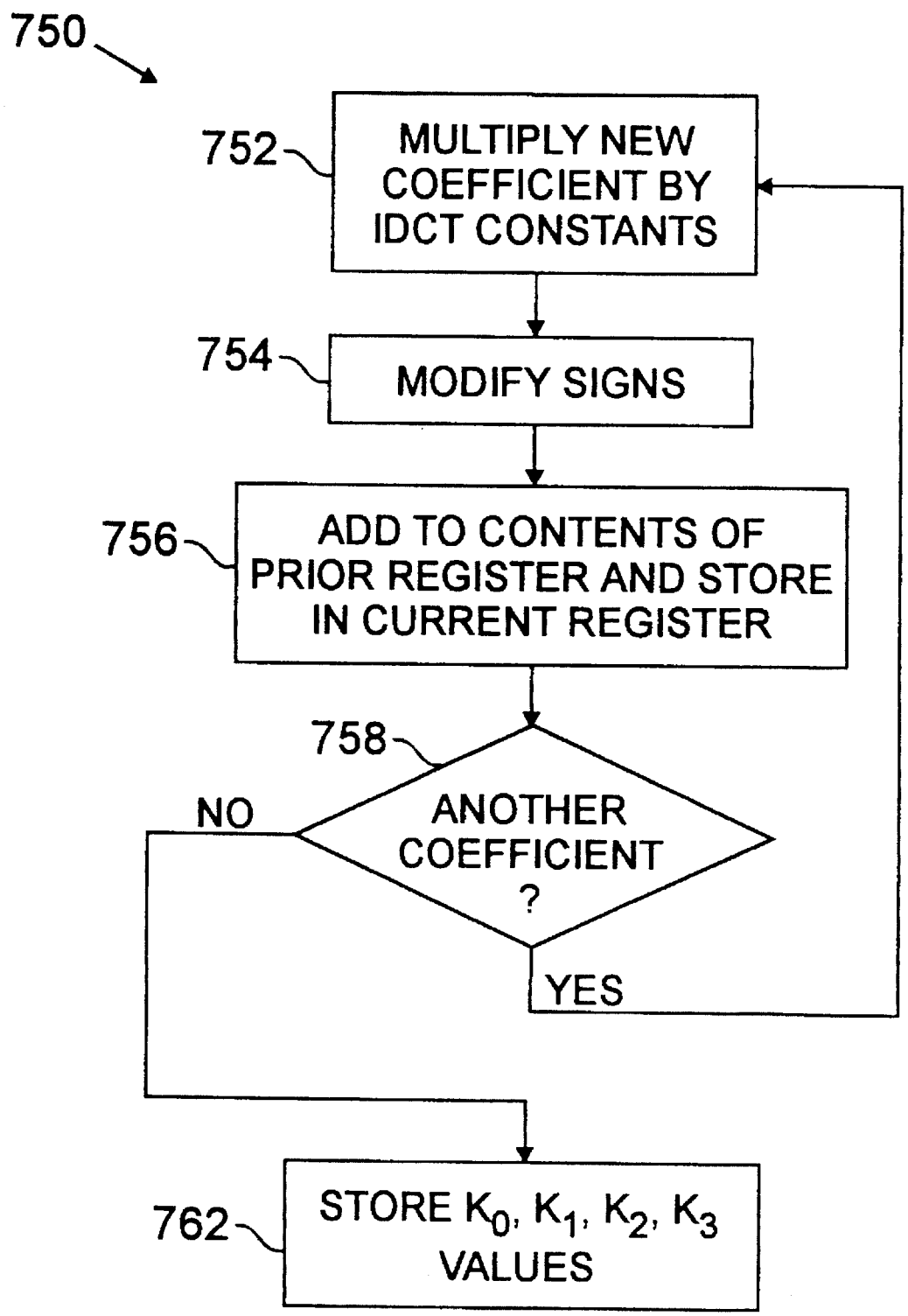
FIG. 7 is a flow chart of the operation of the odd coefficients processor of FIG. 6.

FIGS. 6 and 7, in conjunction with TABLE A, provide a more detailed description of the odd coefficients processor 240. FIG. 6 shows an odd coefficients processor 240, FIG. 7 is a flow chart 750 of the operation of the processor of FIG. 6, and TABLE A is a table of the accumulation steps of the processor of FIG. 6.

FIG. 6 is comprised of four primary cells 400, 500, 600, and 700. The primary cell 400 is comprised of a multiplier 402, a sign change unit 406, an addition circuit 410, a register 412, and a register 418. The primary cells 500, 600, and 700 are comprised of like components, which are numbered similarly with the hundreds place changed appropriately.

The internal components of the primary cell 400 are connected in the following manner. An input bus 401 is connected to a multiplier 402, which is connected to a sign change unit 406 via an output bus 403. An input line 404 is connected to the sign change unit 406, which is connected to an addition circuit 410 via an output bus 408. The addition circuit 410 is connected to a register 412 via an output bus 416. The similarly numbered components of the primary cells 500, 600 and 700, are connected in a similar manner.

The registers 412, 512, 612, and 712 of each of the primary cells 400, 500, 600, and 700 are connected together in a circular manner. The register 412 is connected to the register 512 through an output bus 514, the addition circuit 510, and an output bus 516. Similarly, registers 512 and 612 are connected to registers 612 and 712, respectively, through output buses 614 and 714, addition circuits 610 and 710, and the output buses 616 and 716. The register 712 is connected back to the register 412 through the output bus 414, the addition circuit 410, and the output bus 416 to complete the circular path.

The registers 418, 518, 618, and 718 are connected to the outputs of the registers 412, 512, 612, and 712, respectively. The registers 418, 518, 618, and 718, are connected to the multiplexer 722 via output buses 420, 520, 620, and 720, respectively. The multiplexer 722 has an output bus 724.

In operation, four odd input coefficients $F_1$, $F_5$, $F_7$, and $F_3$ are sent serially to the odd coefficients processor 240. The odd input coefficient $F_1$ arrives first and is simultaneously applied to multipliers 402, 502, 602, and 702, where it is multiplied by IDCT constants equal to 0.9808, 0.5556, 0.1950, and 0.8314, respectively, at step 752 of FIG. 7. The signs of the results are modified as needed by the sign change units 406, 506, 606, and 706, respectively, at step 754. For input coefficient $F_1$, the signed results are $F_1*0.9808$, $F_1*(-0.5556)$, $F_1*0.1950$, and $F_1*(-0.8314)$.

The signed results are then applied to the addition circuits 410, 510, 610, and 710, respectively, where they are added to the previous contents from the register from the preceding primary cell in the circular chain. For example, the signed results applied to the addition circuit 410 are added to the contents from the register 712. Similarly, the signed results applied to addition circuits 510, 610, and 710 are added to the contents from the registers 412, 512 and 612, respectively. The output of addition circuits 410, 510, 610, and 710, is simultaneously clocked at the end of a cycle into registers 412, 512, 612, and 712, respectively, erasing the previous contents in the registers.

Because $F_1$ is the first odd input coefficient, the registers 412, 512, 612, and 712 are empty prior to the processing of $F_1$. Thus, after a first cycle the contents of registers 412, 512, 612, and 712 are as shown in the column labelled "first cycle" in TABLE A, below:

TABLE A

| Register | First Cycle | Second Cycle | Third Cycle | Fourth Cycle |
| --- | --- | --- | --- | --- |
| 412 | $F_1*0.980$ | $F_1*-0.831 + F_5*0.980$ | $F_1*0.195 + F_5*0.831 + F_7*-0.980$ | $F_1*-0.555 + F_5*-0.195 + F_7*-0.831 + F_3*0.980$ |
| 512 | $F_1*-0.555$ | $F_1*0.980 + F_5*0.555$ | $F_1*-0.831 + F_5*0.980 + F_7*0.555$ | $F_1*0.195 + F_5*0.831 + F_7*-0.980 + F_3*-0.555$ |
| 612 | $F_1*0.195$ | $F_1*-0.555 + F_5*-0.195$ | $F_1*0.980 + F_5*0.555 + F_7*0.195$ | $F_1*-0.831 + F_5*0.980 + F_7*0.555 + F_3*0.195$ |
| 712 | $F_1*-0.831$ | $F_1*0.195 + F_5*0.831$ | $F_1*-0.555 + F_5*-0.195 + F_7*-0.831$ | $F_1*0.980 + F_5*0.555 + F_7*0.195 + F_3*0.831$ |

After the contents of the registers 412, 512, 612 and 712 have been stored at the end of the first cycle, the next input coefficient $F_5$ is then simultaneously applied to the multipliers 402, 502, 602, and 702, in the same manner as $F_1$, where $F_5$ is multiplied by the same IDCT constants. The signs of the results are modified in the manner shown in TABLE A. The signed results for the $F_5$ input coefficient are then applied to the addition circuits 410, 510, 610, and 710, where they are added to the contents of the register from the preceding primary cell in the circular chain. For example, the signed result $F_5*0.980$ is applied to the addition circuit 410 where it is added to the contents of the register 712, which is $F_1*(-0.831)$, and the result, $F_5*0.980+F_1*(-0.831)$, is stored in register 412. The previous contents in register 412 are erased. Similarly, the signed results $F_5*(-0.555)$, $F_5*0.195$, and $F_5*(-0.831)$, are added to the output from registers 412, 512, and 612, respectively. The results in each register after the second cycle are shown in the column labelled "second cycle" in TABLE A.

The operation above is repeated for the $F_7$ and the $F_3$ coefficients. The results in the registers after the $F_7$ and $F_3$ coefficient have been processed are shown in the columns labelled "third" and "fourth" cycle, respectively in TABLE A.

After the four cycles have been completed, the results in the registers 712, 412, 512, and 612, are the $K_0$, $K_1$, $K_2$ and $K_3$ values, respectively, which are shown in the column labelled "fourth cycle" in TABLE A. The $K_0$, $K_1$, $K_2$, and $K_3$ values are stored in the registers 718, 418, 518, and 618, respectively, and subsequently registers 412, 512, 612, and 712 are cleared. The $K_0$, $K_1$, $K_2$ and $K_3$ values can be read out in any sequence via the multiplexer 722, on output bus 724. The use of multiplexer 722 allows the odd coefficients processor 240 to be modified for other transforms.

Figure 8:
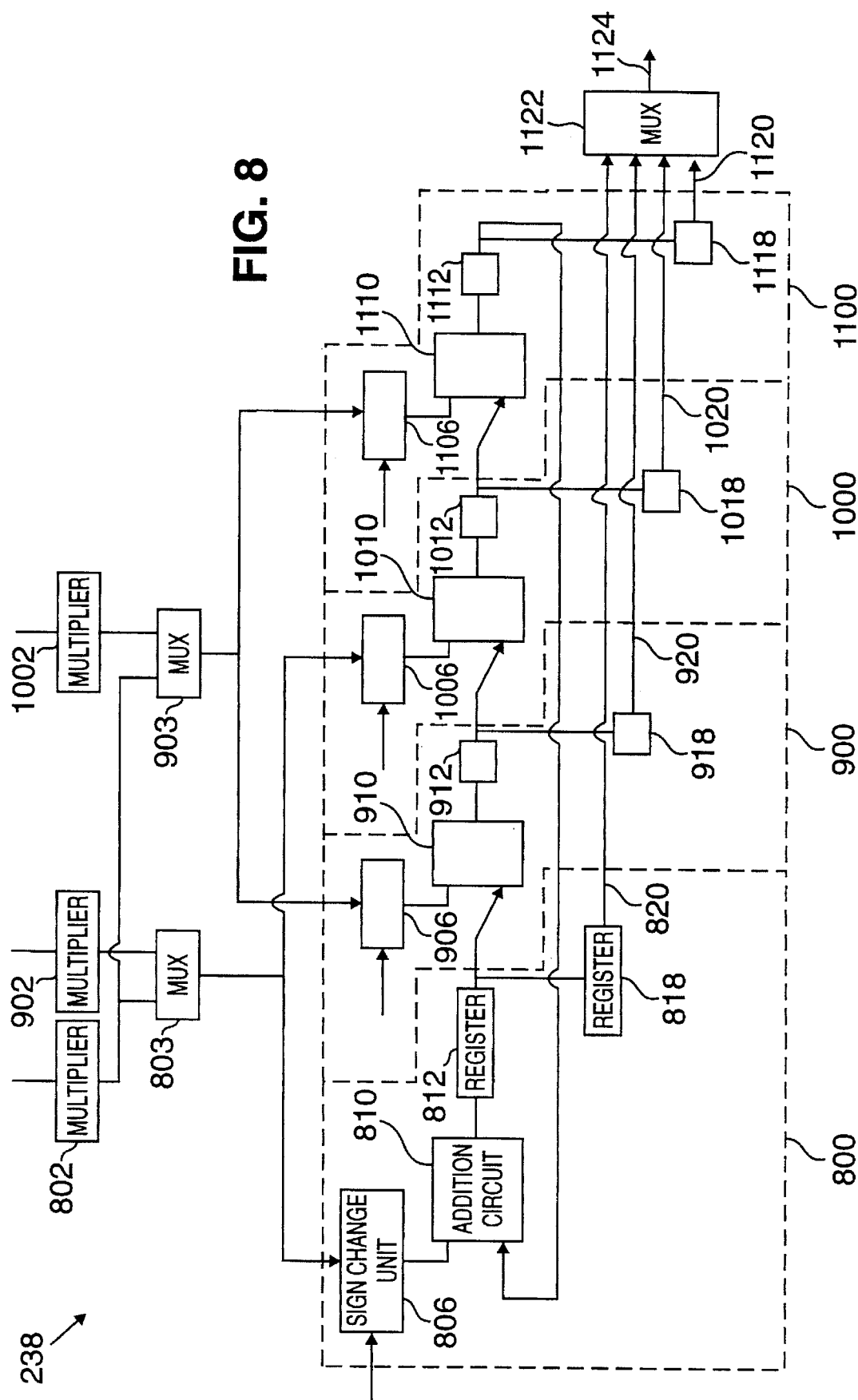
FIG. 8 is a more detailed schematic of the even coefficients processor of FIG. 3.

FIG. 8 is a detailed schematic of an even coefficients processor 238 in accordance with the present invention. The even coefficients processor 238 is similar to the odd coefficients processor 240. Like the odd coefficients processor 240, the even coefficients processor 238 comprises primary cells, in this case primary cells 800, 900, 1000, and 1100.

The primary cell 800 is comprised of a sign change unit 806, an addition circuit 810, a register 812, and a register 818. The primary cells 900, 1000, and 1100 are comprised of like numbered components, with an appropriate change in the hundreds place. The even coefficients processor 238 also includes multipliers 802, 902, and 1002, and multiplexers 803 and 903. The even coefficients 238 processor operates in a like manner to the odd coefficients processor 240 except for the shared use of the multiplier 802 and the use of multiplexers 803 and 903. The multiplexers are used because the form of the matrix B used by the even coefficients processor 238 does not permit the simpler implementation used for the odd coefficients processor. The contents in each register after each cycle for the even coefficients processor are shown in TABLE B below. The final results after the fourth cycle are the values $H_0$, $H_1$, $H_2$, $H_3$, located in the registers 912, 812, 1112, and 1012, respectively. The H vector values can be output in any sequence via multiplexer 1122 on output bus 1124.

TABLE B

| Register | First Cycle | Second Cycle | Third Cycle | Fourth Cycle |
|---|---|---|---|---|
| 812 | $F_0*0.707$ | $F_0*0.707 +$ $F_4*-0.707$ | $F_0*0.707 +$ $F_4*0.707 +$ $F_2*0.923$ | $F_0*0.707 +$ $F_4*-0.707 +$ $F_2*-0.382 +$ $F_6*0.923$ |
| 912 | $F_0*0.707$ | $F_0*0.707 +$ $F_4*0.707$ | $F_0*0.707 +$ $F_4*-0.707 +$ $F_2*0.382$ | $F_0*0.707 +$ $F_4*0.707 +$ $F_2*0.923 +$ $F_6*0.382$ |

TABLE B-continued

| Register | First Cycle | Second Cycle | Third Cycle | Fourth Cycle |
|---|---|---|---|---|
| 1012 | $F_0*0.707$ | $F_0*0.707 +$ $F_4*-0.707$ | $F_0*0.707 +$ $F_4*0.707 +$ $F_2*-0.923$ | $F_0*0.707 +$ $F_4*-0.707 +$ $F_2*0.382 +$ $F_6*-0.923$ |
| 1112 | $F_0*0.707$ | $F_0*0.707 +$ $F_4*0.707$ | $F_0*0.707 +$ $F_4*-0.707 +$ $F_2*0.382$ | $F_0*0.707 +$ $F_4*0.707 +$ $F_2*-0.923 +$ $F_6*-0.382$ |

Figure 9:
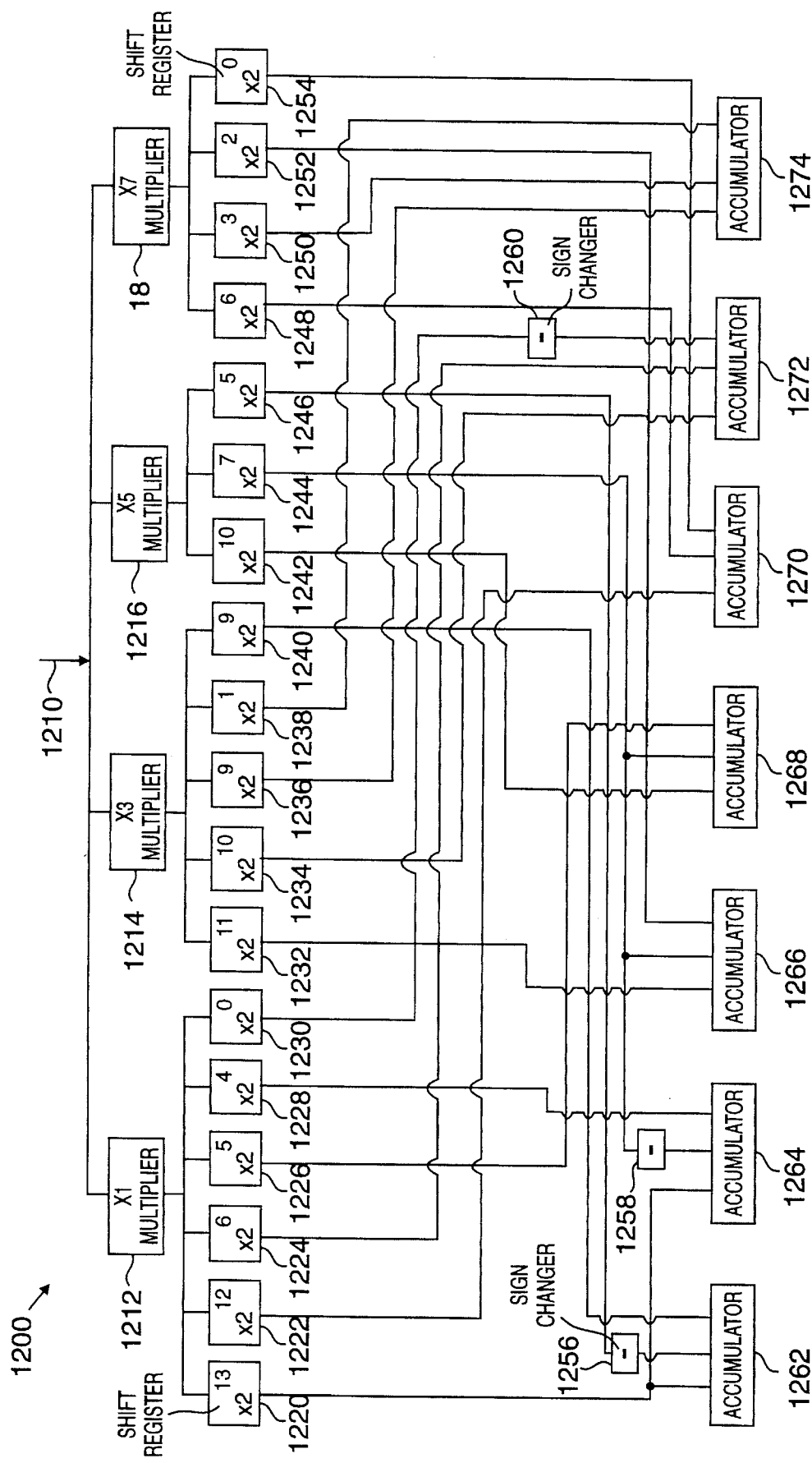
FIG. 9 is a multiplication circuit which uses partial products.

FIG. 9 is a schematic of a multiplication circuit 1200 which multiplies input coefficients or one-dimensionally transformed coefficients by small factors and later adds the results together to produce complete results. The multipliers 402, 502, 602, and 702, 802, 902, and 1002, at the inputs of the odd and even coefficients processors 238 and 240 in FIGS. 6 and 8, can be replaced by the multiplication circuit 1200, if a scaling factor is also provided. The multiplication circuit 1200 permits the factors 1, 3, 5, and 7 to be shared in the computation of a scaled IDCT constant times an input coefficient or scaled IDCT constant times a one-dimensionally transformed coefficient.

Multiplication circuit 1200 is comprised of multipliers 1212, 1214, 1216, and 1218, shift registers 1220–54, sign changers 1256, 1258, and 1260, and accumulators 1262, 1264, 1266, 1268, 1270, 1272, and 1274. The input bus 1210 is connected to the inputs of the multipliers 1212–18. The outputs of the multipliers 1212, 1214, 1216, and 1218 are operatively connected to the inputs of the shift registers 1220–30, 1232–40, 1240–46, and 1248–54, respectively. The shift registers 1220, 1240, and 1246 are operatively connected to the inputs of the accumulator 1262. The shift registers 1220, 1228, and 1244 are similarly connected to the accumulator 1264. The shift registers 1232, 1244, and 1252 are similarly operatively connected to accumulator 1266. The shift registers 1226, 1242, and 1244 are similarly operatively connected to the accumulator 1268. The shift registers 1222, 1248, and 1254 are similarly operatively connected to the accumulator 1270. The shift registers 1224, 1230, and 1234 are similarly operatively connected to the accumulator 1272. The shift registers 1236, 1238, and 1250 are similarly operatively connected to the accumulator 1274. Sign change units 1256, 1258, and 1260 provide necessary sign changes between the shift registers 1246, 1244, and 1230 and the inputs of the accumulators 1262, 1264, and 1272, respectively.

TABLE C below will be used to describe the operation of the multiplication circuit 1200 of FIG. 8. TABLE C comprises five columns. The first column lists the IDCT constants. The second column lists an IDCT constant multiplied by one-half to include the one-half term of the IDCT equation. The third and fourth columns show scaled versions of one-half times the IDCT constant; the values in the third column are decimal and the values in the fourth column are in binary. Finally, the fifth column shows a partial products representation of the values in the third and fourth column.

TABLE C

| IDCT Constant | IDCT Constant * ½ | IDCT Constant * ½ * $2^{14}$ | Binary | Partial Products |
|---|---|---|---|---|
| 0.9808 | 0.4904 | 8035 | 01,1111,0110,0011 | $1 \times 2^{13} - 5 \times 2^5 + 3 \times 2^0$ |
| 0.9238 | 0.4619 | 7568 | 01,1101,1001,0000 | $1 \times 2^{13} - 5 \times 2^7 + 1 \times 2^4$ |
| 0.8314 | 0.4157 | 6812 | 01,1010,1001,1100 | $3 \times 2^{11} + 5 \times 2^7 + 7 \times 2^2$ |
| 0.7072 | 0.3536 | 5792 | 01,0110,1010,0000 | $5 \times 2^{10} + 5 \times 2^7 + 1 \times 2^5$ |
| 0.5556 | 0.2778 | 4551 | 01,0001,1100,0111 | $1 \times 2^{12} + 7 \times 2^6 + 7 \times 2^0$ |
| 0.3826 | 0.1913 | 3135 | 00,1100,0011,1111 | $3 \times 2^{10} + 1 \times 2^6 - 1 \times 2^0$ |
| 0.1950 | 0.0975 | 1598 | 00,0110,0011,1110 | $3 \times 2^9 + 7 \times 2^3 + 3 \times 2^1$ |

A coefficient, such as $F_1$, is received on the input bus 1210 and multiplied by 1, 3, 5, and 7 in the multipliers 1212, 1214, 1216, and 1218. The outputs of the multipliers 1212, 1214, 1216, and 1218 are simultaneously applied to the appropriate shift register of shift registers 1220–54. Each shift register shifts its input by an appropriate amount to cause a multiplication by $2^n$, where n is the number of shifts.

For example, to obtain a scaled representation of F1*0.4904, the partial products shown in the fifth column of the first row of TABLE C are added together. $F_1$ is multiplied by 1 in multiplier 1212 and then by $2^{13}$ in shift register 1220 to form partial product $F_1*1*2^{13}$. $F_1$ is simultaneously multiplied by 5 in multiplier 1216 and then by $2^5$ in shift register 1246 and then the sign is changed in sign change unit 1256 to form partial product $F_1*(-5*2^2)$. $F_1$ is also simultaneously multiplied by 3 in multiplier 1218 and then by $2^0$ in shift register 1240 to form partial product $F_1*3*2^0$. The partial products $F_1*1*2^{13}$, $F_1*(-5*2^5)$ and $F_1*3*2^0$, are added together in accumulator 1262 to form a scaled representation of the complete product $0.5*F_1*0.9808$.

Similarly, the other scaled full products can be arrived at as listed in the fifth column of the TABLE C.

Adder cells for this purpose can also be stacked up in Wallace tree adder style using carry save adder cells. Wherever carry propagation is required, full carry look ahead circuitry based on a Generate/Propagate technique is used. To increase performance and speed of this type of high precision computational circuit one should use custom cells at least for critical paths.

The previous description was for an inverse discrete cosine transform. However, with some modifications the forward discrete cosine transform can be implemented in accordance with the present invention. The following is a one-dimensional forward transform equation.

$$\begin{bmatrix} C_0 \\ C_4 \\ C_2 \\ C_6 \\ C_1 \\ C_5 \\ C_7 \\ C_3 \end{bmatrix} = \begin{bmatrix} A & A \\ \hline C & -C \end{bmatrix} \begin{bmatrix} P_0 \\ P_5 \\ P_3 \\ P_6 \\ P_7 \\ P_2 \\ P_4 \\ P_1 \end{bmatrix}$$

C is the frequency domain coefficients vector, P is the time domain coefficients vector and A and C are parts of DCT constant matrix as defined below:

$$A = \begin{vmatrix} +.707 & +.707 & +.707 & +.707 \\ +.707 & -.707 & +.707 & -.707 \\ +.923 & -.382 & -.923 & +.382 \\ +.382 & +.923 & -.382 & -.923 \end{vmatrix}$$

-continued $$C = \begin{vmatrix} +.980 & -.555 & +.195 & -.831 \\ +.555 & -.195 & +.831 & +.980 \\ +.195 & -.831 & -.980 & +.555 \\ +.831 & +.980 & -.555 & +.195 \end{vmatrix}$$

The one-dimensional transform equation can be separated into two separate operations as shown below:

$$\begin{bmatrix} C_0 \\ C_4 \\ C_2 \\ C_6 \end{bmatrix} = A \begin{bmatrix} P_0 + P_7 \\ P_5 + P_2 \\ P_3 + P_4 \\ P_6 + P_1 \end{bmatrix}$$

$$\begin{bmatrix} C_1 \\ C_5 \\ C_7 \\ C_3 \end{bmatrix} = C \begin{bmatrix} P_0 - P_7 \\ P_5 - P_2 \\ P_3 - P_4 \\ P_6 - P_1 \end{bmatrix}$$

Thus if the time domain coefficients of vector P are added and subtracted as indicated, the results can be subjected to separate operations which are part of a one-dimensional transform. The separate operations can be done by processors similar to the odd and even coefficients processors shown in FIGS. 6 and 8.

We claim:

1. An apparatus for transforming a two-dimensional block of input coefficients representative of a signal, the apparatus comprising:

a first transpose buffer having an input and first and second outputs, the input adapted to receive input coefficients representative of a signal, a first multiplexer having first and second inputs and an output, the first input connected to the first output of the first transpose buffer;

a second multiplexer having first and second inputs and an output, the first input connected to the second output of the first transpose buffer;

a one-dimensional transformer comprising:

a first coefficients processor having an input and an output, the input connected to the output of the first multiplexer, said first coefficients processor comprising a first plurality of primary cells connected in a circular manner;

a second coefficients processor having an input and an output, the input connected to the output of the second multiplexer, said second coefficients processor comprising a second plurality of primary cells connected in a circular manner; and a second transpose buffer having an input connected to the outputs of the first and second coefficients processors, a first output connected to the second input of the first multiplexer, and a second output connected to the second input of the second multiplexer.

2. The apparatus of claim 1 wherein the one-dimensional transformer performs an inverse discrete cosine transform on frequency domain coefficients which are representative of a signal.

3. The apparatus of claim 2 wherein the first coefficients processor receives coefficients from odd locations in a vector of coefficients and the second coefficients processor receives coefficients from even locations in a vector of coefficients.

4. The apparatus of claim 1 wherein the one-dimensional transformer performs a forward discrete cosine transform on time domain coefficients which are representative of a signal.

5. The apparatus of claim 1 wherein the first coefficients processor is comprised of a partial product circuit which is comprised of:

a plurality of partial product multipliers each having an input for receiving a coefficient and an output for sending a partial product and a plurality of accumulators each having a plurality of inputs and an output, each input of each accumulator connected to an output of one of the partial product multipliers, each accumulator summing a plurality of partial products to create a scaled coefficient.

6. The apparatus of the claim 5 and wherein each one of the plurality of primary cells has an input and an output, each input of each primary cell connected to an output of an accumulator of the partial product circuit;

each primary cell comprising an addition circuit and a register, the registers from the plurality of primary cells being connected in a circular chain, and wherein the addition circuit of each primary cell receives a scaled coefficient, adds it to the contents from the register of the preceding primary cell in the circular chain, and stores the result in the register of the current primary cell.

7. The apparatus of claim 1, wherein each of the first plurality of primary cells is comprised of a multiplier, an addition circuit, and a register, the registers of said first plurality of primary cells being connected in a circular manner.

8. The apparatus of claim 1, wherein each of the second plurality of primary cells comprises a multiplier, an addition circuit, and a register, the registers of said second plurality of primary cells being connected in a circular manner.

9. An apparatus for providing a multi-dimensional transform of a set of input coefficients representative of a signal, the apparatus comprising:

a first transpose buffer having an input and an output, the input adapted to receive input coefficients;

a multiplexer having first and second inputs and an output, the first input connected to the output of the first transpose buffer;

a one-dimensional transformer having an input and an output, the input connected to the output of the multiplexer, said transformer comprising a plurality of primary cells connected in a circular manner; and a second transpose buffer having an input connected to the output of the one-dimensional transformer, and an output connected to the second input of the multiplexer.

10. The apparatus of claim 9 wherein the one-dimensional transformer is an inverse discrete cosine transformer.

11. The apparatus of claim 10 wherein a two-dimensional transform is provided.

12. The apparatus of claim 9 wherein the one-dimensional transformer is a forward discrete cosine transformer.

13. The apparatus of claim 12 wherein a two-dimensional transform is provided.

14. The apparatus of claim 9 wherein a two-dimensional transform is provided.

15. A method for transforming a two-dimensional block of input coefficients representative of a signal comprising:

receiving the two-dimensional block of input coefficients;

transposing the input coefficients;

sending an input coefficient vector to a one-dimensional transformer;

one-dimensionally transforming the input coefficient vector;

transposing the one-dimensionally transformed vector of coefficients utilizing a plurality of primary cells connected in a circular manner;

sending the one-dimensionally transformed vector of coefficients back to the one-dimensional transformer; and one-dimensionally transforming the one-dimensionally transformed vector of coeficients.

16. The method of claim 15 wherein one-dimensionally transformed coefficients are transposed by alternately reading and writing columns from and to a transpose buffer, and reading and writing rows from and to a transpose buffer.

17. The method of claim 15 wherein the one-dimensional transform performed is an inverse discrete cosine transform.

18. The method of claim 15 wherein the one-dimensional transform performed is a forward discrete cosine transform.

19. A method for transforming a two-dimensional block of input coefficients representative of a signal, the method comprising:

transposing the two-dimensional block of input coefficients;

sending the two-dimensional block of input coefficients to a one-dimensional transformer and one-dimensionally transforming the two-dimensional block of input coefficients by:

sending a first set of the two-dimensional block of input coefficients to a first coeficients processor in the one-dimensional transformer, said processor comprising a plurality of primary cells connected in a circular manner, and performing part of the operations necessary for a one-dimensional transform in the first coefficients processor; and sending a second set of the two-dimensional block of input coefficients to a second coeficients processor in the one-dimensional transformer, said second processor comprising a second plurality of primary cells connected in a circular manner, and performing part of the operations necessary for a one-dimensional transform in the second coefficients processor;

transposing the one-dimensionally transformed coefficients;

sending the one-dimensionally transformed coefficients to the one-dimensional transformer; and one-dimensionally transforming the one-dimensionally transformed coefficients by repeating the one-dimensional transform steps specified above for the input coefficients.

20. The method of claim 19 wherein one-dimensionally transformed coefficients are transposed by alternately reading and writing columns from and to a transpose buffer, and reading and writing rows from and to a transpose buffer.

21. The method of claim 19 wherein the one-dimensional transform is an inverse discrete cosine transform.

22. The method of claim 21 wherein input coefficients from odd and even locations of a vector of coefficients are sent to the first and second coefficients processors, respectively, and one-dimensionally transformed coefficients from odd and even locations of a vector of coefficients are sent to the first and second coefficients processors, respectively.

23. A method of using a one-dimensional transformer to partially perform a two-dimensional transform of a two-dimensional block of input coefficients representative of a signal comprising:

passing the two-dimensional block of input coeficients through a one-dimensional transformer comprising a plurality of primary cells connected in a circular manner to form a one-dimensionally transformed output; and passing the one-dimensionally transformed output through the one-dimensional transformer.

24. The method of claim 23 wherein the two-dimensional transform is an inverse discrete cosine transform.

25. The method of claim 23 wherein the two-dimensional transform is a forward discrete cosine transform.

26. A television having circuitry for compressing an input video signal represented by a two dimensional block of input coeficients, the television comprising:

a first transpose buffer having an input and first and second outputs, the input adapted to receive input coefficients;

a first multiplexer having first and second inputs and an output, the first input connected to the first output of the first transpose buffer;

a second multiplexer having first and second inputs and an output, the first input connected to the second output of the transpose buffer;

a one-dimensional transformer comprising:

a first coefficients processor having an input and an output, the input connected to the output of the first multiplexer, said first coefficients processor comprising a first plurality of primary cells connected in a circular manner;

a second coefficients processor having an input and an output, the input connected to the output of the second multiplexer, said second coefficients processor comprising a second plurality of primary cels connected in a circular manner; and a second transpose buffer having an input connected to the output of the first and second coefficients processors, a first output connected to the second input of the first multiplexer, and a second output connected to the second input of the second multiplexer.

27. The television of claim 26 wherein the one-dimensional transformer performs an inverse discrete cosine transform.

28. The television of claim 27 wherein the first coefficients processor receives coefficients from odd locations in a coefficient vector and the second coefficients processor receives coefficients from even locations in a coefficient vector.

29. The television of claim 26, wherein each of said first plurality of primary cells is comprised of a multiplier, an addition circuit, and a register, the registers from said first plurality of primary cells being connected in a circular manner.

30. The television of claim 26, wherein each of said second plurality of primary cells is comprised of a multiplier, addition circuit and a register, the registers from said second plurality of primary cells being connected in a circular manner.

* * * * *